(12) United States Patent
Gelencser

(10) Patent No.: US 12,020,359 B2
(45) Date of Patent: Jun. 25, 2024

(54) SYSTEM AND METHOD FOR IMMERSIVE TELECOMMUNICATIONS SUPPORTED BY AI ANALYSIS

(71) Applicant: Zoltan Gelencser, Singapore (SG)

(72) Inventor: Zoltan Gelencser, Singapore (SG)

(73) Assignee: Zoltan Gelencser, Singapore (SG)

( * ) Notice: Subject to any disclaimer, the term of this patent is extended or adjusted under 35 U.S.C. 154(b) by 165 days.

(21) Appl. No.: 17/543,998

(22) Filed: Dec. 7, 2021

(65) Prior Publication Data

US 2022/0180585 A1   Jun. 9, 2022

Related U.S. Application Data

(60) Provisional application No. 63/122,190, filed on Dec. 7, 2020.

(51) Int. Cl.
| | |
|---|---|
| *G06T 13/40* | (2011.01) |
| *G06F 1/16* | (2006.01) |
| *G06F 13/40* | (2006.01) |
| *G06V 40/20* | (2022.01) |

(52) U.S. Cl.
CPC .............. *G06T 13/40* (2013.01); *G06F 1/163* (2013.01); *G06F 1/1694* (2013.01); *G06F 13/40* (2013.01); *G06V 40/23* (2022.01)

(58) Field of Classification Search
CPC .............................. G06F 1/1694; G06T 13/40
See application file for complete search history.

(56) References Cited

U.S. PATENT DOCUMENTS

| | | |
|---|---|---|
| 8,724,906 B2 | 5/2014 | Shotton |
| 9,251,590 B2 | 2/2016 | Sharp |
| 9,344,707 B2 | 5/2016 | Lee |
| 9,424,678 B1 | 8/2016 | Enakiev |
| 9,588,341 B2 | 3/2017 | Bar-Zeev |
| 9,761,032 B2 | 9/2017 | Tong |
| 10,191,559 B2 | 1/2019 | Mandella |
| 10,529,139 B1 | 1/2020 | Greene |
| 2012/0122574 A1 | 5/2012 | Fitzpatrick |
| 2012/0293506 A1 | 11/2012 | Vertucci |
| 2015/0149104 A1 | 5/2015 | Baker |
| 2016/0258779 A1 | 9/2016 | Hol |
| 2017/0084070 A1 | 3/2017 | Chamdani |
| 2017/0090554 A1 | 3/2017 | Pececnik |
| 2018/0225880 A1 | 8/2018 | Yasutake |
| 2018/0239144 A1 | 8/2018 | Woods |
| 2018/0315247 A1 | 11/2018 | Van Andel |

(Continued)

FOREIGN PATENT DOCUMENTS

| | | |
|---|---|---|
| EP | 2843621 | 3/2015 |
| EP | 2926224 | 10/2015 |
| KR | 101667607 B1 | 10/2016 |
| WO | 2016045005 A1 | 3/2016 |
| WO | 2018146546 | 8/2018 |

OTHER PUBLICATIONS

"Estimation of Full-Body Poses Using Only Five Inertial Sensors: An Eager or Lazy Learning Approach?" by Frank J. Wouda et al; in Sensors 2016, 16, 2138; doi:10.3390/s16122138, 17 pages.

(Continued)

*Primary Examiner* — Matthew Salvucci
(74) *Attorney, Agent, or Firm* — GRAESER ASSOCIATES INTERNATIONAL INC.; D'vorah Graeser

(57) ABSTRACT

A system and method for immersive telecommunications by tracking the movement of objects and/or persons with optical camera data and optionally with one or more additional sensor(s).

35 Claims, 13 Drawing Sheets

(56) References Cited

U.S. PATENT DOCUMENTS

| | | | |
|---|---|---|---|
| 2019/0018567 | A1 | 1/2019 | Murphy |
| 2019/0122410 | A1 | 4/2019 | Chamdani |
| 2019/0188895 | A1 | 6/2019 | Miller, IV |
| 2019/0310757 | A1 | 10/2019 | Lee |
| 2019/0362529 | A1 | 11/2019 | Wedig |
| 2020/0002017 | A1 | 1/2020 | Shi |
| 2020/0306640 | A1* | 10/2020 | Kolen ................... G06N 3/047 |
| 2020/0413144 | A1* | 12/2020 | Fukuda ............ H04N 21/44204 |

OTHER PUBLICATIONS

"Full-Body Locomotion Reconstruction of Virtual Characters Using a Single Inertial Measurement Unit" by Christos Mousas; Sensors 2017, 17, 2589; doi:10.3390/s17112589, 21 pages.

"Inertial Sensor-Based Touch and Shake Metaphor for Expressive Control of 3D Virtual Avatars" by Shashidhar Patil et al; Sensors 2015, 15, 14435-14457; doi:10.3390/s150614435.

"Real-time Simultaneous Pose and Shape Estimation for Articulated Objects Using a Single Depth Camera", by Mao Ye et al; in IEEE Transactions on Pattern Analysis and Machine Intelligence, vol. 38, No. 8, pp. 1517-1532, Aug. 1, 2016, doi: 10.1109/TPAMI.2016.2557783.

"Xsens MVN: Consistent Tracking of Human Motion Using Inertial Sensing" by Martin Schepers et al; Technical Report Mar. 2018, published by Xsens Technologies B.V., P.O. Box 559, 7500AN Enschede, the Netherlands,; DOI: 10.13140/RG.2.2.22099.07205, 9 pages.

Office Action (Notice of Allowance and Fees Due (PTOL-85)) dated Sep. 16, 2022 for U.S. Appl. No. 17/098,316 (pp. 1-10).

\* cited by examiner

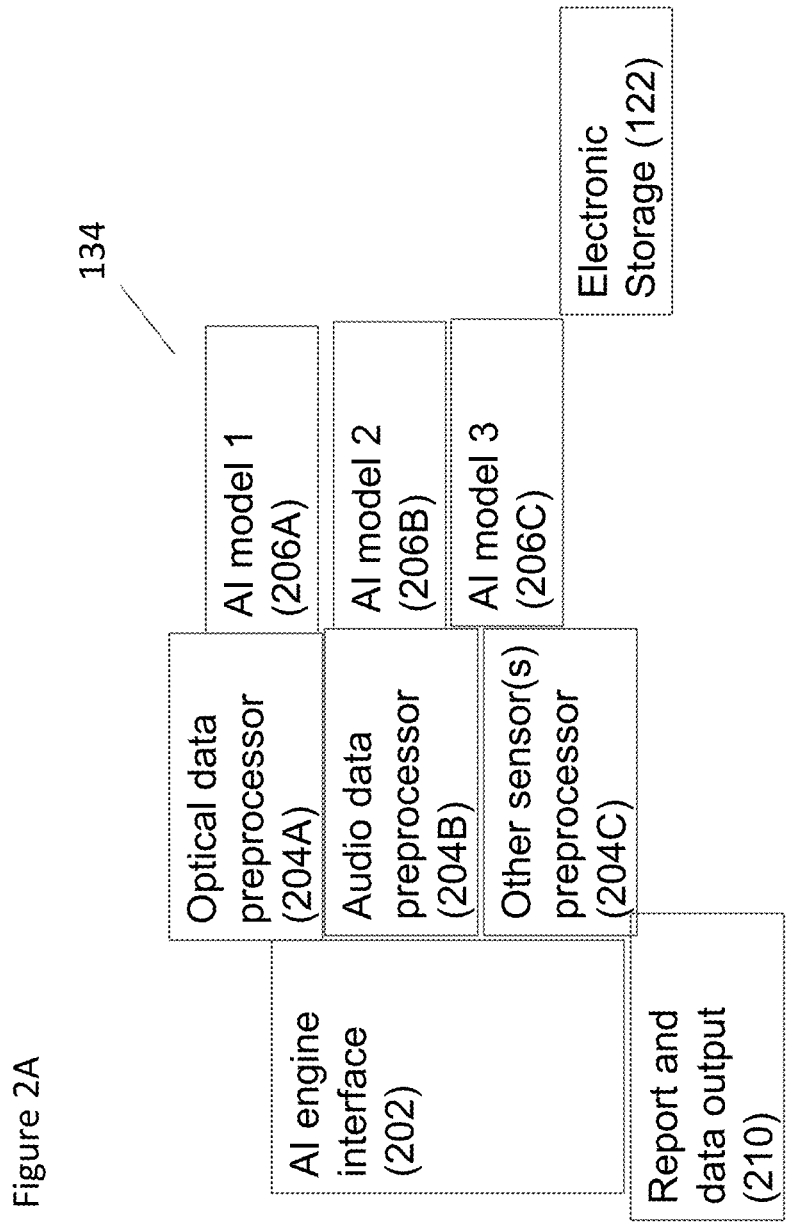

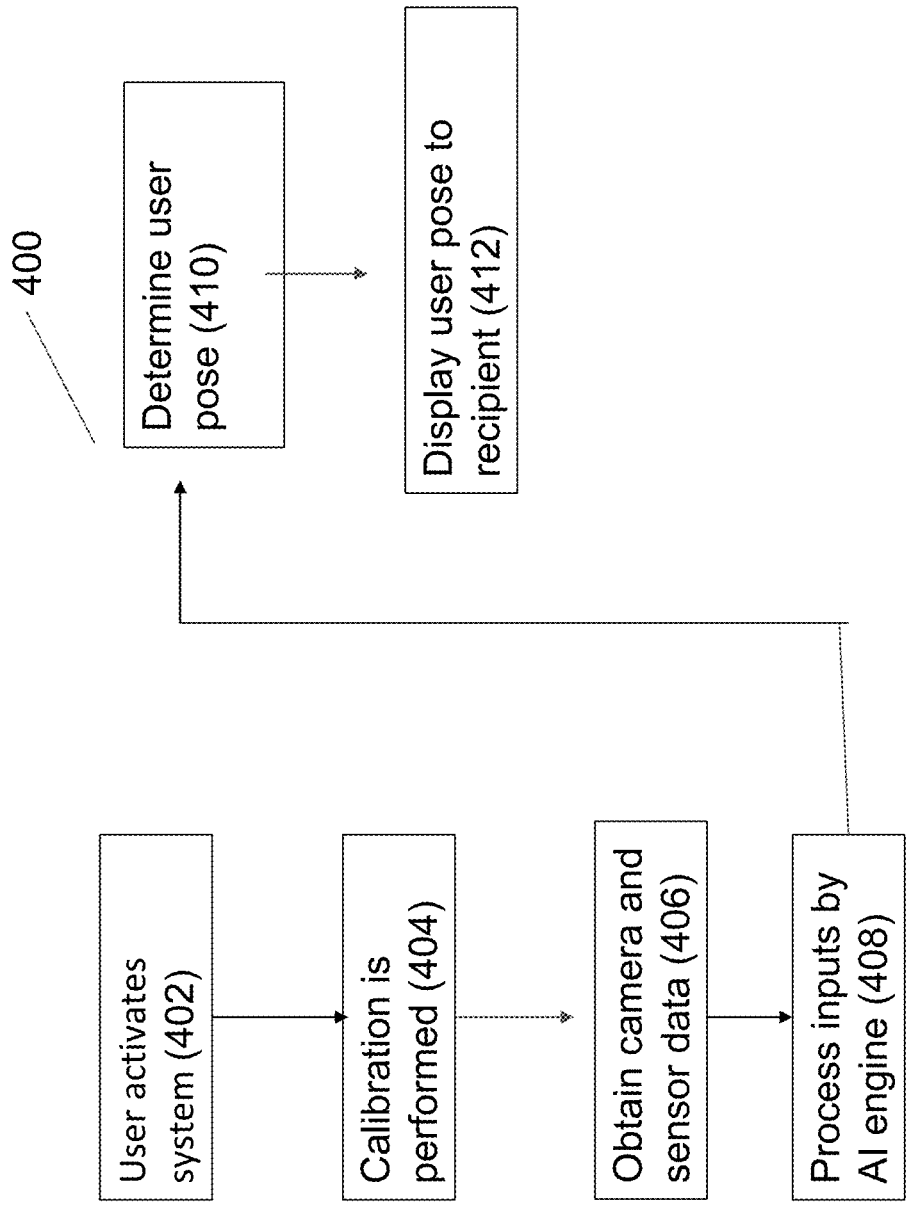

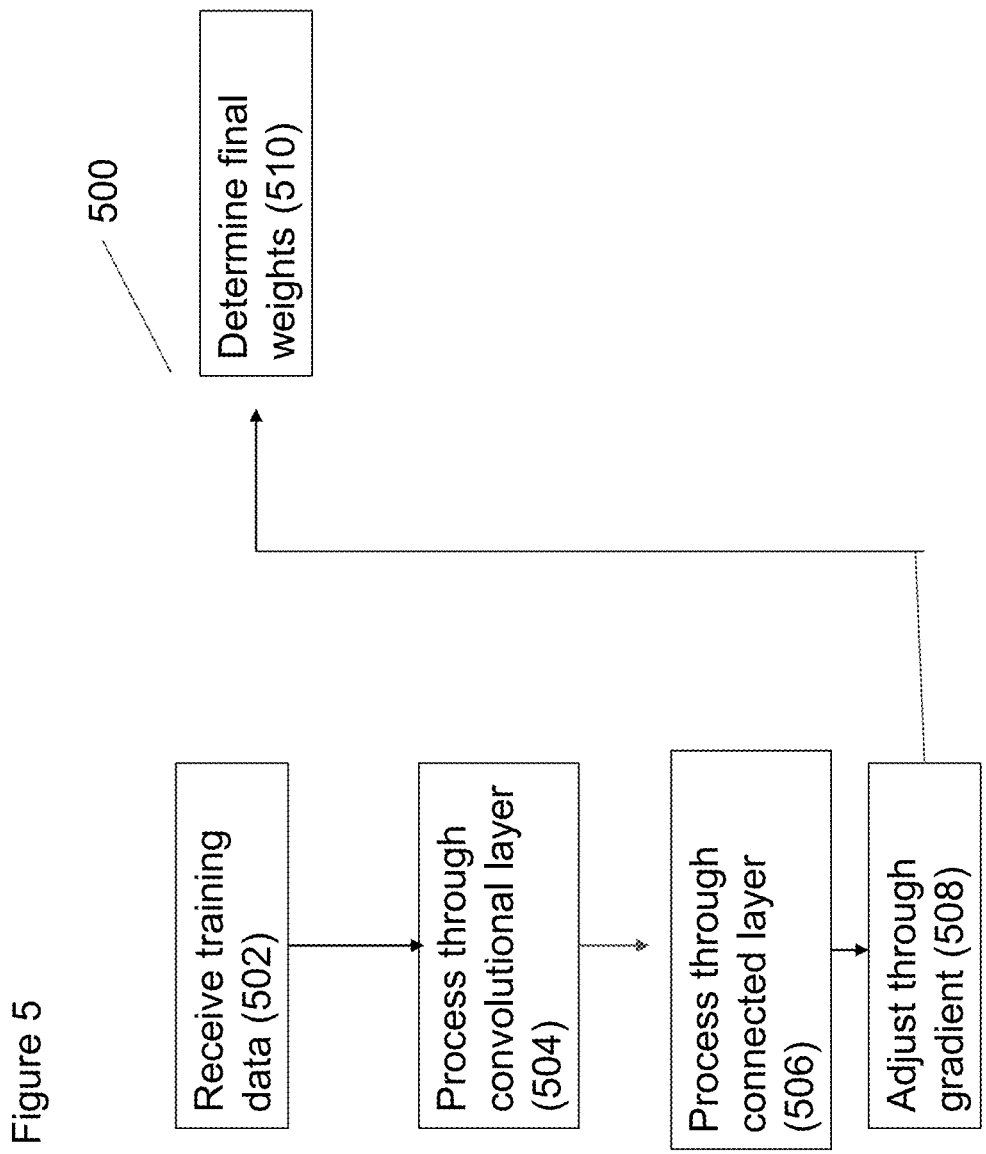

SYSTEM AND METHOD FOR IMMERSIVE TELECOMMUNICATIONS SUPPORTED BY AI ANALYSIS

FIELD OF THE INVENTION

The present invention is of a system and method for immersive telecommunications as described herein, and in particular, for such a system and method for tracking movement of objects and/or persons through analysis of optical camera and/or other sensor data as supported by AI (Artificial Intelligence), for verbal and nonverbal communication.

BACKGROUND OF THE INVENTION

Certain systems have been proposed for monitoring the movements of users, for example with cameras, including depth and/or image based cameras, and optionally with other sensors added.

For example, US20190122410A1 describes a system for capturing and analyzing motions to render a human avatar animation. The movements of the user are tracked and then compared to a desired standard, for example for movements involved in sports.

US20190362529A1 describes skeletal systems for animating virtual avatars. The application relies on depth sensors and/or image based cameras to determine how the user is moving.

These systems typically require either highly specialized camera systems or else having multiple sensors placed on the user, in order to provide the information necessary for monitoring and communicating user movements.

BRIEF SUMMARY OF THE INVENTION

The background art does not teach or describe a system or method for monitoring the movements of users and/or objects in real time, to support verbal and nonverbal communication or transmission of such movement or movements, without requiring depth sensors and/or external cameras to track such movements, and also without requiring additional sensors or external tracking markers to be worn by the user. The background art also does not teach or suggest a system or method for training to track such movements.

The present invention overcomes the drawbacks of the background art by providing a system and method for immersive telecommunications by tracking the movement of objects and/or persons with optical camera data and optionally with one or more additional sensor(s). Such one or more additional sensor(s) are not required and also do not necessarily need to be worn by the user. As used herein, the term "immersive telecommunications" includes any one or more of virtual reality, augmented reality, mixed reality, extended reality, immersive verbal and nonverbal telecommunication technologies as well as verbal and nonverbal telecommunication in the reality-virtuality continuum.

Movement tracking, through analysis of optical data, is then used to animate a representation, such as an avatar, that represents the person and/or object. Such a representation is of a digital twin. The term "digital twin" as used herein may refer to a digital replica of one or more of potential and actual physical assets (physical twin), processes, people, places, systems and devices that can be used for various purposes.

Movement may be tracked in real time, which reduces latency of communication, and increases the speed and efficiency of communication. If present, the one or more additional sensors may comprise one or more of an IMU (Inertial Measurement Unit), an accelerometer, magnetometer, a gyroscope or other such sensors. If present, preferably such one or more additional sensors are built-in to a communication device such as for example a mobile communication device.

The system as described herein does not require any type of depth camera. As described herein, the term "optical camera" preferably comprises an image-based camera rather than a depth camera.

Furthermore, the system as described herein does not require an additional or fixed external reference point, thereby supporting communication mobility. The system also does not require a depth sensor. This provides a significant advantage for true mobility in providing representation-based communication, as these optical systems and devices have many drawbacks for both operational functions and also portability.

By contrast, according to at least some embodiments, the system of the present invention only requires the user to be viewable through an optical camera and to communicate with a mobile phone or AR/VR headset, smart contact lens or glasses, or other communication modality. Optionally and preferably, the communication modality comprises the optical camera as well. If one or more additional sensors are present, then they are also preferably incorporated into the communication modality. For example, if a mobile phone is being used, preferably the optical camera is a mobile phone optical camera, and the one or more additional sensor(s) are incorporated in the mobile phone. As used herein, the term "communicate" refers to transmitting at least movement/motion information, and optionally audio information, such as voice information for example.

According to at least some embodiments, there is provided a system and method for controlling animation of a representation through controlled movements of the user, as detected by data from at least one or more optical camera(s) and optionally also one or more additional sensor(s). Such one or more optical cameras and one or more additional sensors may be provided in a single device, such as a smartphone or other mobile communication device, or may be provided separately.

Optionally the representation is not adjusted on the fly or in real time according to the body of the user. Controlling the representation may be used for mobile communication, for example as augmented reality (AR).

For such a communication system, preferably the representation features a three-dimensional avatar, as selected, uploaded and/or created by the user for example.

When the user wishes to communicate by using the representation, the user activates the user computational device, such as for example a mobile communication device such as a smart phone. The optical camera provides optical data which is then analyzed by an AI engine at a server. The AI engine is then able to apply the analyzed optical data to render one or more movements of a representation. Optionally additional sensor(s) provide additional data, such as for example an IMU. If present, preferably such an additional sensor is not an external additional sensors but rather is built-into, or incorporated into, a communication modality such as for example a mobile phone. Preferably the IMU or other additional sensor creates a clean real-time digital stream of quaternions, through sensor fusion.

The user may perform a calibration phase, for example to perform one or more movement(s) or poses with regard to the optical camera and/or one or more additional sensor(s). The calibration phase may also include an association or setup phase, during which the optical camera is preferably placed so as to be able to capture the optical data. Also if an additional sensor is present, then the location information for the sensor is preferably provided. For future sessions, if the optical camera placement and/or the sensor location information remains the same or at least appears to be correct to the system, then this initial association or setup phase may not be performed during calibration.

Preferably, the animation is controlled through an AI engine, as operated by the server. As the user moves and speaks (for a human digital twin), the AI engine causes the representation to move in a corresponding manner, by moving different parts of the rigging associated with the representation. The AI engine analyzes information provided by the optical camera, in terms of images, and then preferably determines one or more movements of the body and/or one or more body parts of the user. Each such movement is then translated by the AI engine to a movement of a part of the representation.

According to at least some embodiments, the AI engine may be trained according to one or more of a plurality of different types of data. Such types of data may include, but are not limited to, image data stream, data flow from quaternions, and animation data flow or a combination thereof. The image data may be rendered through an animation engine, such that the output of the animation data from the animation engine may be used to train the AI engine. The data from quaternions may be obtained for example through a training sensor set, in which one or more sensors attached to a moving entity, such as the body of a user. Such sensors in the training sensor set may include, but are not limited to, an IMU, an accelerometer, magnetometer, a gyroscope, microphone or a combination thereof, optionally including a plurality of each of such sensors. Preferably, the training sensor set features a sufficiently large number of sensors such that an accurate measurement of movements of the moving entity may be captured.

The system may be used for AR (augmented reality) based communication, as well as for other types of virtual communication. Such communication may be mobile; for example, the user can communicate through their mobile telephone and use the built-in optical camera and/or sensor(s). The protocol employed is preferably an efficient binary protocol, which supports real time communication. The efficient binary protocol supports communication from the optical camera and/or one or more additional sensors, if present, to a server. Such communication may be direct from the camera and/or sensor to the server, or indirect, from the camera and/or sensor to an intermediary device, and then to the server. The intermediary device may for example comprise a user computational device or an object computational device. The binary protocol may also be used for audio data, such as voice data for example. The binary protocol is a communication protocol supporting transmission of data, in which the voice data is handled in a synchronized manner; and for the optical camera and/or sensor based data, the data is not strictly synchronized. Such data may be handled in a stateful or non-stateful manner. Without wishing to be limited in any way, the binary protocol may be considered as a type of data transmission protocol in a similar category to TCP/IP or other communication protocol.

The support of real-time movement animation provides such advantages as nonverbal communication, and body language and more nuanced communication, without wishing to be limited by a closed list.

Selecting a representation and then causing the representation to move also overcomes disadvantages involved in tracking a user's body (or another moving entity) as a three-dimensional volume that is moving in space.

Algorithms which attempt to realistically provide such tracking require depth cameras and non-mobile optical systems, as noted above. They are also computationally very resource-intensive, which is problematic for mobile communication.

In addition to avatars as representations of users, representations may also be provided for physical objects, which could then have an optical camera aimed at the physical object or may have an additional sensor tracking the object's movement.

Such representations could be useful for training a user through remote learning and any suitable immersive telecommunications application or modality, for example for operation and repair of physical equipment.

According to at least some embodiments, the AI engine analysis may be used for assisting gameplay through a game engine, as the user plays the game while the optical camera and/or built-in sensor(s) track the user's movements; the user's movements may then be correlated with game play. The game engine may also be correlated with the previously described motion server, so that movement of the body part(s) of the user is correlated with the body parts of the representation.

Implementation of the method and system of the present invention involves performing or completing certain selected tasks or steps manually, automatically, or a combination thereof.

Moreover, according to actual instrumentation and equipment of preferred embodiments of the method and system of the present invention, several selected steps could be implemented by hardware or by software on any operating system of any firmware or a combination thereof.

Unless otherwise defined, all technical and scientific terms used herein have the same meaning as commonly understood by one of ordinary skill in the art to which this invention belongs. The materials, methods, and examples provided herein are illustrative only and not intended to be limiting.

An algorithm as described herein may refer to any series of functions, steps, one or more methods or one or more processes, for example for performing data analysis.

Implementation of the apparatuses, devices, methods and systems of the present disclosure involve performing or completing certain selected tasks or steps manually, automatically, or a combination thereof.

Specifically, several selected steps can be implemented by hardware or by software on an operating system, of a firmware, and/or a combination thereof.

For example, as hardware, selected steps of at least some embodiments of the disclosure can be implemented as a chip or circuit (e.g., ASIC).

As software, selected steps of at least some embodiments of the disclosure can be implemented as a number of software instructions being executed by a computer (e.g., a processor of the computer) using an operating system.

In any case, selected steps of methods of at least some embodiments of the disclosure can be described as being performed by a processor, such as a computing platform for executing a plurality of instructions.

Software (e.g., an application, computer instructions) which is configured to perform (or cause to be performed)

certain functionality may also be referred to as a "module" for performing that functionality, and also may be referred to a "processor" for performing such functionality.

Thus, processor, according to some embodiments, may be a hardware component, or, according to some embodiments, a software component.

Further to this end, in some embodiments: a processor may also be referred to as a module; in some embodiments, a processor may comprise one or more modules; in some embodiments, a module may comprise computer instructions—which can be a set of instructions, an application, software—which are operable on a computational device (e.g., a processor) to cause the computational device to conduct and/or achieve one or more specific functionality.

Some embodiments are described with regard to a "computer," a "computer network," and/or a "computer operational on a computer network." It is noted that any device featuring a processor (which may be referred to as "data processor"; "pre-processor" may also be referred to as "processor") and the ability to execute one or more instructions may be described as a computer, a computational device, and a processor (e.g., see above), including but not limited to a personal computer (PC), a server, a cellular telephone, an IP telephone, a smart phone, a PDA (personal digital assistant), a thin client, a mobile communication device, a smart watch, head mounted display or other wearable that is able to communicate externally, a virtual or cloud based processor, a pager, and/or a similar device.

Two or more of such devices in communication with each other may be a "computer network."

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the drawings:

FIGS. 2A and 2B show different embodiments of a non-limiting exemplary version of AI engine 134;

FIG. 4 shows an exemplary non-limiting flow for an exemplary system as described herein;

FIG. 5 shows an exemplary non-limiting flow for training an exemplary AI model as described herein;

DESCRIPTION OF AT LEAST SOME EMBODIMENTS

Figure 1A:
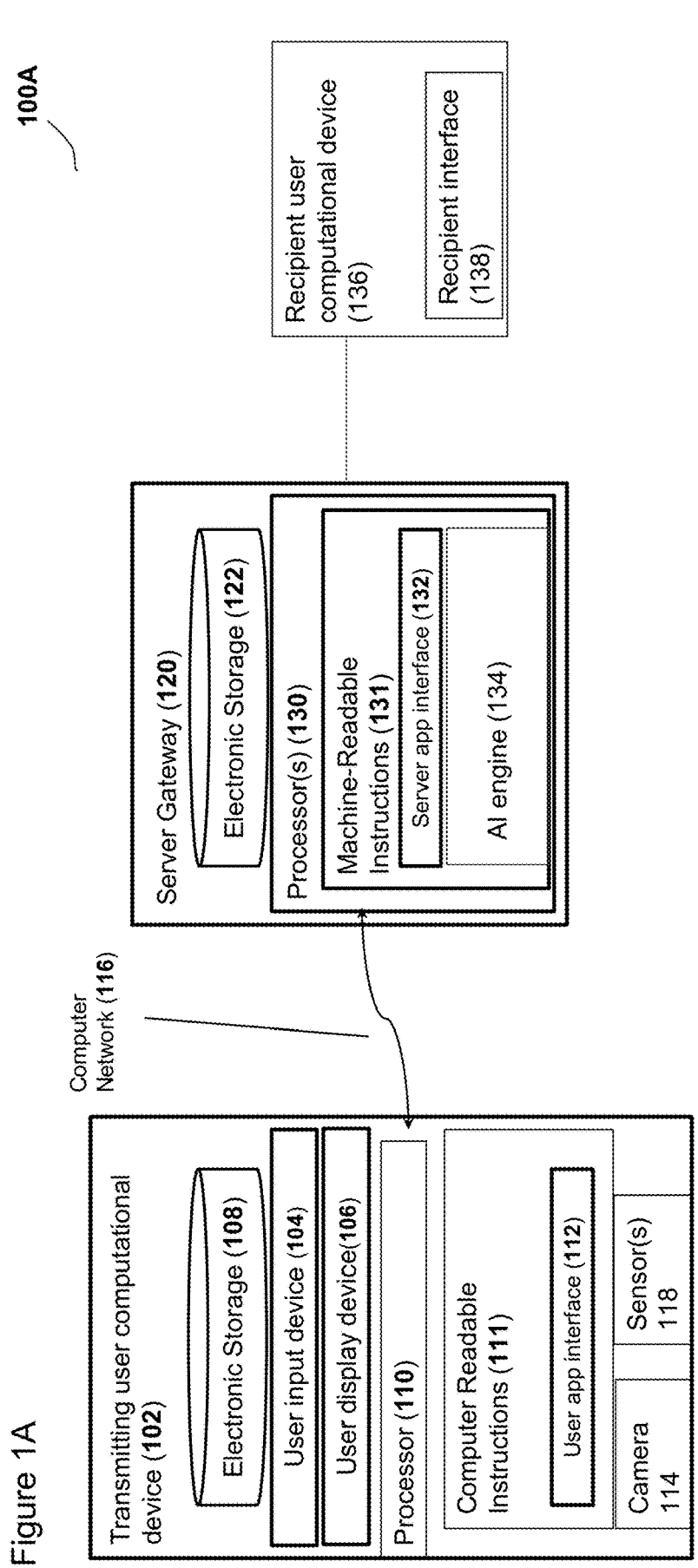
FIGS. 1A and 1B show a non-limiting exemplary system for providing communication for immersive telecommunications.

Turning now to the drawings, there is shown, in FIG. 1A, a non-limiting exemplary system for providing communication for immersive telecommunications, for example according to any modality as described above.

As shown in the system 100A there is provided a transmitting user computational device 102, which is in communication with a server gateway 120 through computer network 116. Server gateway 120 features an AI engine 134. Transmitting user computational device 102 preferably comprises at least a camera 114, and optionally and preferably also one or more sensors 118. Optionally and preferably camera 114 and/or sensor(s) 118 are built-in to, or an integral part of, transmitting user computational device 102. Alternatively camera 114 and/or sensor(s) 118 are separate from, but in communication with, transmitting user computational device 102 (not shown).

Camera 114 captures one or more images relating to movements of a user associated with transmitting user computational device 102. For example and without limitation, camera 114 may comprise a front and/or rear camera as associated with, built-in or formed with a mobile communication device such as a smart phone. Camera 114 may capture such images in the form of streaming video for example.

Sensor(s) 118 may for example comprise one or more of a gyroscope, GPS (Global Positioning System), compass, IMU, accelerometer, magnetometer, and the like. Sensor(s) 118 preferably comprise, additionally or alternatively, a microphone or other audio capture device, which may for example alternatively be associated with user input device 104.

Sensor data from sensor(s) 118 and/or optical data from camera 114 is preferably transmitted according to a binary protocol that compresses the size of the data, thereby requiring less communication bandwidth for transmission.

At least one sensor 118 may measure rotation and may for example be IMUs as described above. The IMU measures linear acceleration and angular velocity. Preferably the IMU creates a clean real-time digital stream of quaternions, through sensor fusion. Such data is then provided to AI engine 134, which converts the measured rotation to movement of a particular part of the representation. Optionally smoothing algorithms may be used, for example to smooth motion over a set of joints and/or to simulate movement of musculature or other underlying aspects of the representation, for example as a pre-rigged avatar. Optionally smoothing may be used to apply the optical data to the pre-rigged avatar and/or to combine the optical data with one or more other sensors 118, such as for example an IMU.

User interface 112 enables the user controlling transmitting user computational device 102 to, for example, perform calibration and other functions with camera 114 and/or from sensor(s) 118, and also to receive communication through user interface 112.

For example, user interface 112 permits the user to communicate verbally or with text to recipient user computational device 136.

Server gateway 120 comprises an AI engine 134 for rendering data provided from camera 114 and also optionally from the plurality of sensors 118. The rendered data is then preferably analyzed by one or more AI models within AI engine 134, as described herein. The analysis is then preferably used to render a pre-rigged avatar model, such that the pre-rigged avatar model can be animated. Alternatively a non-avatar model (representation) may be rendered.

Server gateway 120 then transmits this rendered information as animation to a recipient user computational device 136 for display through a recipient interface 138. Preferably the rendered information comprises the static and dynamic components of the representation model, such that these components are animated according to the data from camera 114 and also optionally from sensor(s) 118, as analyzed by one or more AI models and then transmitted. Components with the same reference number as for transmitting user computational device 102 but with "B" at the end, have the same or similar function.

Recipient user computational device 136 may comprise a laptop or any type of computer, a mobile phone or any type of wireless communicator with a display, or an AR/VR headset or glasses, or any other computational device or computer as described.

As described herein, for a recipient to receive communication in the form of a representation, such as an avatar, animated by sensor based information as described herein, such a recipient would interact with a display provided through a device including, but not limited to, a laptop or any type of computer, a mobile phone or any type of wireless communicator with a display, or an AR/VR headset or glasses.

Two way communication is possible but is not shown here.

Recipient interface 138 may for example comprise any type of suitable software which is able to read the information about the representation and the animation (movement) of the representation, for example according to the above described rendered data and information.

Also optionally the optical data and/or sensor output is at least partially processed by AI engine 134, for example to provide streaming data to recipient interface 138, such that the pre-rigged avatar visuals and movements are streamed for display (and/or visuals and movements for another such representation). Recipient interface 138 then optionally renders the streamed information avatar with animation, and optionally with audio such as voice for an audible display. Optionally one of the previously described sensor(s) 118 comprises a microphone or other audio sensor for obtaining audio data, such as voice and/or sounds (for example from a non-human animal or an object, or system of objects) for example. Recipient interface 138 preferably then synchronizes the audio data display with the animation display for animating the representation.

Preferably recipient interface 138 also renders texture with the animation and also optionally audible data for a combined display with animation of the representation. Alternatively data is provided as streaming data from AI engine 134, with reduced or minimal processing for display by recipient interface 138.

All or partial processing may also occur at transmitting user computational device 102.

Optionally transmitting user computational device 102 does not perform any calculations or processing of the data, but instead only transmits the data onward to server gateway 120.

Various types of wireless connections may be used throughout system 100, for example WiFi, cellular connectivity protocols, Bluetooth, radiofrequency data and the like.

Optionally user interface 112 would also display corresponding animation from another transmitting user computational device, as animated by AI engine 134, but this is not shown.

For such a communication system, preferably the representation that is animated by AI engine 134 features a three-dimensional representation, such as a three-dimensional avatar which may be selected, uploaded and/or created by the user.

When the user wishes to communicate by using the representation, the user activates camera 114 and/or sensor(s) 118, and preferably calibrates them. For example, the user may be asked to assume a certain pose and/or to perform certain actions.

Transmitting user computational device 102 also comprises a processor 110A and a memory 111A.

Functions of processor 110A preferably relate to those performed by any suitable computational processor, which generally refers to a device or combination of devices having circuitry used for implementing the communication and/or logic functions of a particular system.

For example, a processor may include a digital signal processor device, a microprocessor device, and various analog-to-digital converters, digital-to-analog converters, and other support circuits and/or combinations of the foregoing.

Control and signal processing functions of the system are allocated between these processing devices according to their respective capabilities.

The processor may further include functionality to operate one or more software programs based on computer-executable program code thereof, which may be stored in a memory, such as a memory 111A in this non-limiting example.

As the phrase is used herein, the processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Also optionally, memory 111A is configured for storing a defined native instruction set of codes.

Processor 110A is configured to perform a defined set of basic operations in response to receiving a corresponding basic instruction selected from the defined native instruction set of codes stored in memory 111A.

For example and without limitation, memory 111A may store a first set of machine codes selected from the native instruction set for receiving information from the user through user app interface 112 regarding the recipient user at recipient user computational device 136; a second set of machine codes selected from the native instruction set for receiving data from camera 114 and/or one or more sensors 118, optionally including performing preprocessing; and a third set of machine codes selected from the native instruction set for transmitting such information and data to server gateway 120 for rendering by AI engine 134.

Similarly, server gateway 120 preferably comprises a processor 130 and a memory 131 with related or at least similar functions, including without limitation functions of server gateway 120 as described herein.

For example and without limitation, memory 131 may store a first set of machine codes selected from the native instruction set for receiving the optical camera data, and optionally also the sensor data, and contact information from user computational device 102, a second set of machine codes selected from the native instruction set for executing functions of AI engine 134; and a third set of machine codes selected from the native instruction set for transmitting the rendered animation to recipient user computational device 136.

Such transmission of animation and contacts may be provided through a server app interface 132, which may also communicate with user app interface 112 and recipient interface 138.

Transmitting user computational device 102 also preferably includes user input device 104A and user display device 106A. The user input device 104A may optionally be any type of suitable input device including but not limited to a keyboard, microphone, mouse, a keyboard/mouse combination or other pointing device and the like. User display device 106A is able to display information to the user for example from user app interface 112. Electronic storage may be provided through electronic storage 108A, for example for additional data storage and the like.

Server gateway 120 also preferably comprises an electronic storage 122, for example for additional data storage and the like.

Figure 1B:
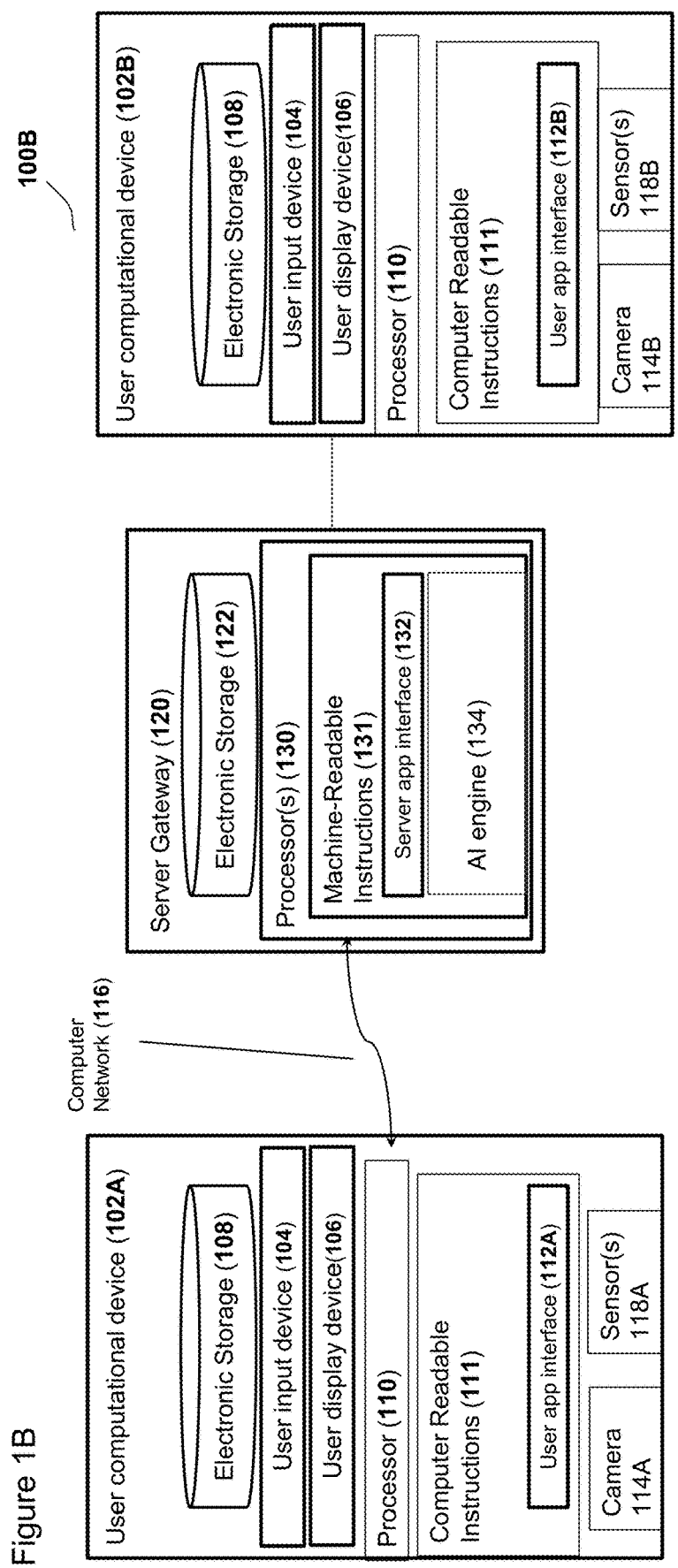

FIG. 1B shows an exemplary two-way communication system. In this non-limiting example, items with the same reference number have the same or similar function. In this case there are two users who are both transmitters and receivers, shown as user computational device 102A and user computational device 102B.

User computational device 102B also has camera 114B and/or sensor(s) 118B for showing movements of that particular user.

The user movement information from all sensors 118A and 118B, and also cameras 114A and 114B, is transmitted to AI engine 134 for rendering, followed by transmission of the rendered animation to the receiving user computational device.

For example user computational device 102A would send sensor information regarding the movements of the user from camera 114A and sensor(s) 118A, which would then be transmitted to server gateway 120 for rendering to animation by AI engine 134.

The animation would then be transmitted to user computational device 102B for display by the user interface 112B.

Correspondingly, information relating to the movements of the user controlling user computational device 102B would be obtained through data obtained from camera 114B and sensor(s) 118B, which would again transmitted to server gateway 120 as previously described. The rendered animation from AI engine 134 would be transmitted to user computational device 102A for display by user app interface 112A.

Figure 2B:
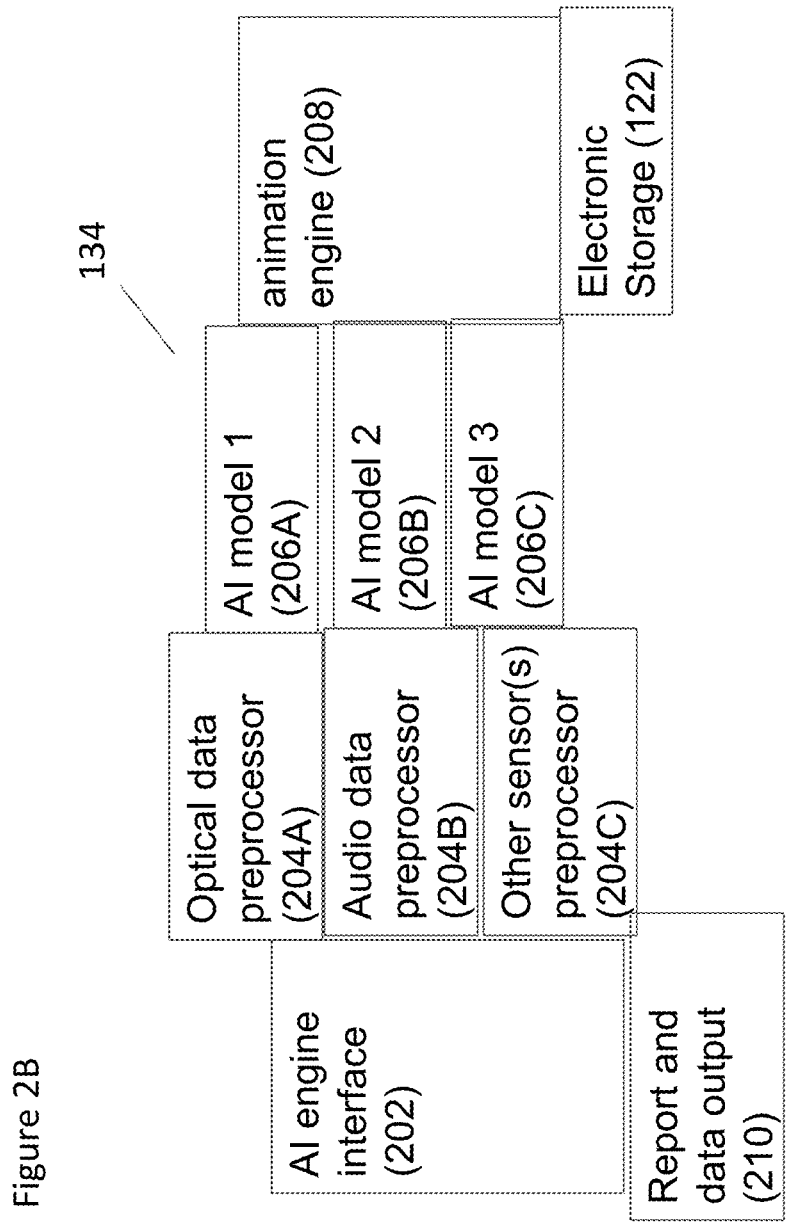

FIGS. 2A and 2B show different embodiments of a non-limiting exemplary version of AI engine 134. Turning to FIG. 2A, as shown, AI engine 134 features an AI engine interface 202, for receiving input optical data and optionally other sensor data. Input data is preferably fed to one of a plurality of data preprocessors 204. AI engine interface 202 also preferably outputs animation instructions, based upon the input data. Optionally and preferably, the input data to AI engine interface 202 may be a continuous data flow and the output animation instructions may be such a continuous output flow. The output instructions may be sent to an animation engine (not shown, see FIG. 2B).

Input optical data is preferably fed to an optical data preprocessor 204A. If available, audio data is preferably fed to an audio data preprocessor 204B. If data from one or more other sensors, such an IMU for example, is available, such data is preferably fed to an additional sensor data preprocessor 204C. From each such data preprocessor 204, the preprocessed data is fed to at least one of a plurality of AI models 206, shown as AI models 206A-C for the purpose of illustration only and without any intention of being limiting. Optionally, each type of data is fed to a separate AI model 206. For example, optical data may be fed to an AI model 206A, audio fed to AI model 206B, and so forth for each type of data. Alternatively, AI models 206A-C may be combined to a single AI model (not shown). AI models 206A-C analyze the input data to create outputs that may support animation. For example, one or more of AI models 206A-C may track user movements using at least one of optical data and/or optionally other sensor data. If used, optionally and preferably the additional sensor data is from a built-in sensor such as for example a built-in IMU.

With regard to FIG. 2A, from AI models 206A-C, the output information from the models is fed to an external animation engine (not shown). The below described functions of an animation engine 208 at FIG. 2B would be performed by the external animation engine instead.

With regard to FIG. 2B, the output information from the models is fed to animation engine 208. Optionally, as described in greater detail below, an AI engine, using the trained AI model creates animations without animation engine 208 or an external animation engine (not shown). Animation engine 208 preferably animates a representation, such as a pre-rigged avatar for example as described in greater detail below, according to one or more parameters. These parameters may be deterministic, for example according to size and volume requirements for the human body and/or a part thereof (or a corresponding set of parameters for a non-human animal or an object, or system of objects). These parameters may also relate to modeled aspects of movement, for example the results of an AI model for analyzing optical data and determining how such data may be used to derive one or more movements of the human data. Animation engine 208 also preferably synchronizes audio data to such movements, for example by combining voice data with the movements of the user as translated to avatar or other representation animation.

The output of animation engine 208 is preferably returned through AI engine 202. Optionally data and/or the status of the analysis (for example, according to any failures) may be stored in electronic storage 122. A report regarding such stored data, as well as the data itself with any results, may be provided through a report and data output 210.

Figure 3A:
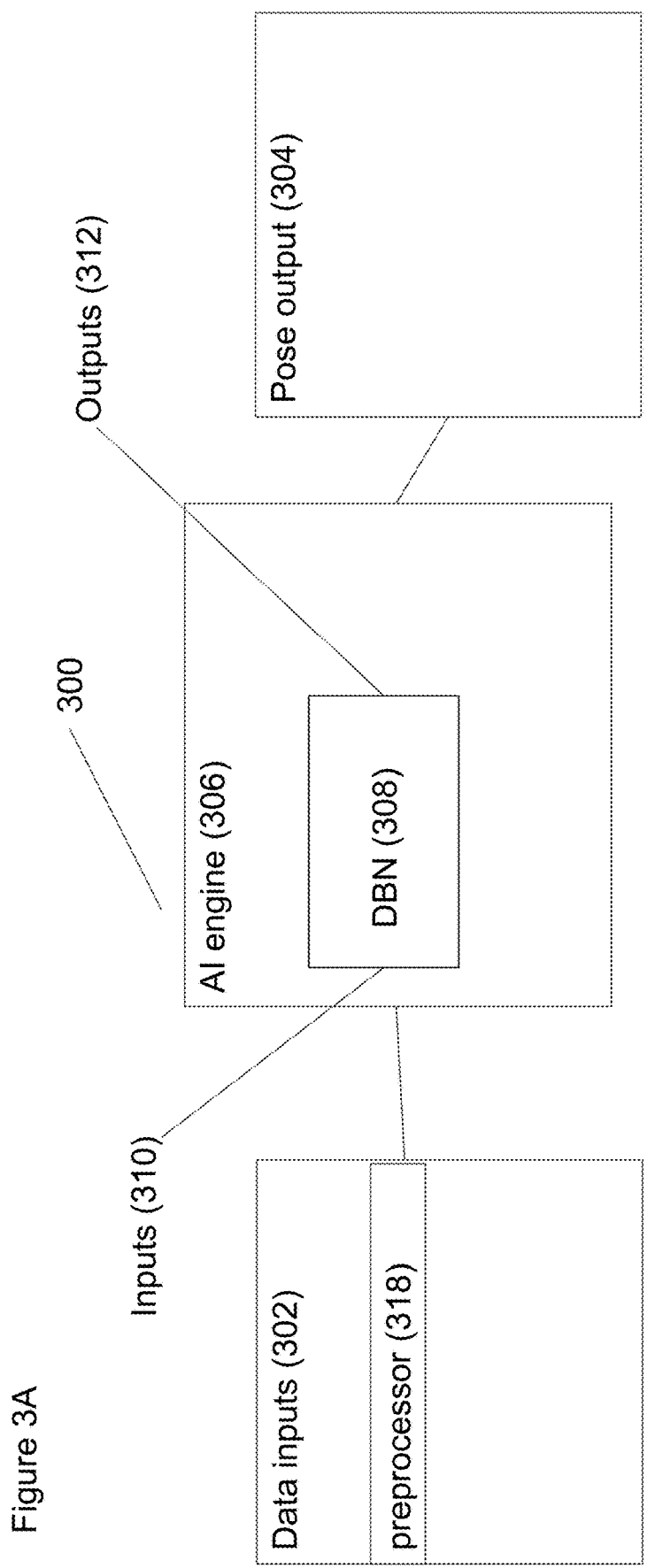
FIGS. 3A and 3B show non-limiting exemplary AI models according to at least some embodiments.
Figure 3B:
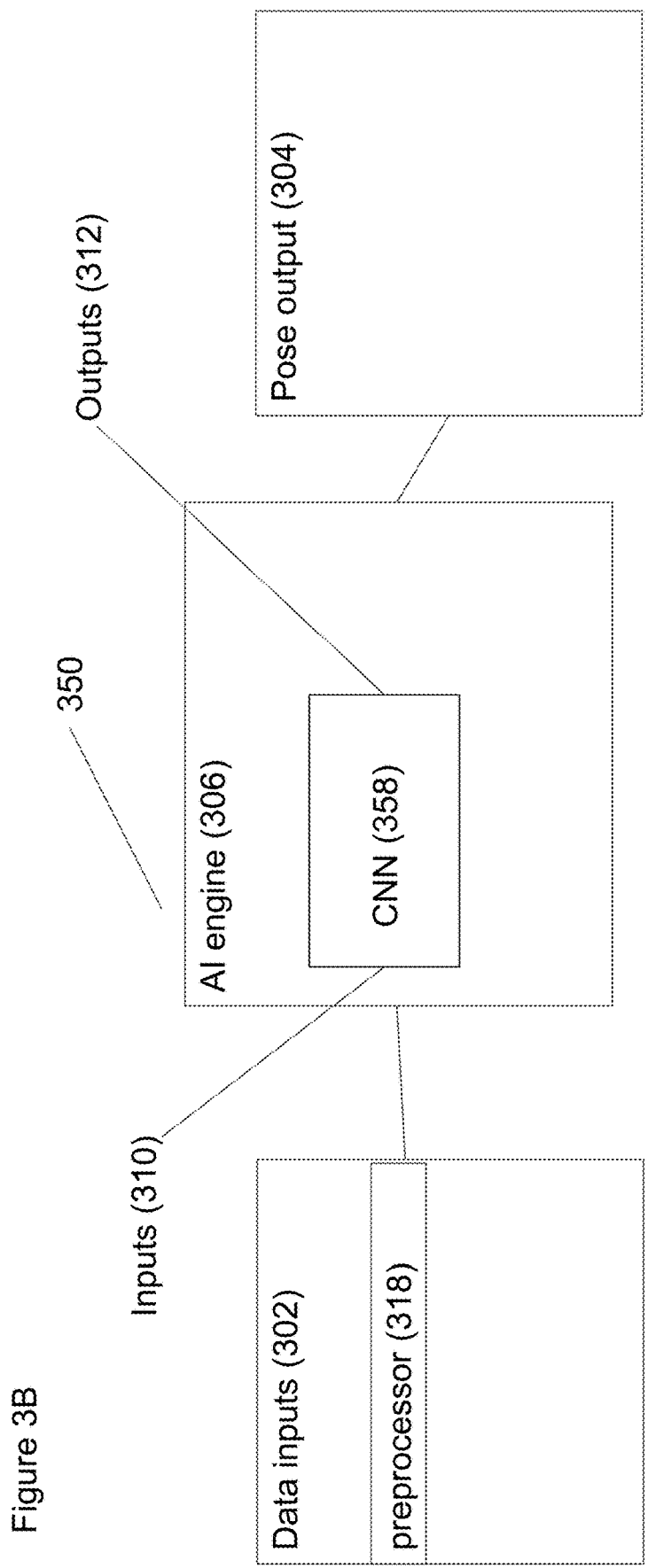

FIGS. 3A and 3B show non-limiting exemplary AI models according to at least some embodiments. Turning now to FIG. 3A as shown in a system 300, data inputs are preferably provided at 302 and preferably are also preprocessed with the data preprocessor in 318. The data preprocessor preferably analyzes the data from the optical camera and optionally one or more additional sensor(s) for preprocessing. The preprocessed data is then fed into an AI engine in 306 and information quality output is provided by the AI engine in 304. In this non-limiting example, AI engine 306 comprises a DBN (deep belief network) 308. DBN 308 features input neurons 310, a neural network (not shown) and then outputs 312.

A DBN is a type of neural network composed of multiple layers of latent variables ("hidden units"), with connections between the layers but not between units within each layer.

Optionally the DBN is combined with one or more additional AI models, each of which would output analysis of one type of data, which could then be combined through ensemble learning for pose output for an avatar as a non-limiting example of the representation. Preferably the pose output is provided for a pre-rigged avatar, such that the AI models is able to estimate the pose within parameters.

FIG. 3B relates to a non-limiting exemplary system 350 with similar or the same components as FIG. 3A, except for the neural network model. This particular model is embodied in a CNN (convolutional neural network) 358, which is a different model than that shown in FIG. 3A.

A CNN is a type of neural network that features additional separate convolutional layers for feature extraction, in addition to the neural network layers for classification/identification. Overall, the layers are organized in 3 dimensions: width, height and depth. Further, the neurons in one layer do not connect to all the neurons in the next layer but only to a small region of it. Lastly, the final output will be reduced to a single vector of probability scores, organized along the depth dimension. It is often used for audio and image data analysis, but has recently been also used for natural language processing (NLP; see for example Yin et al, Comparative Study of CNN and RNN for Natural Language Processing, arXiv:1702.01923v1 [cs.CL] 7 Feb. 2017).

FIG. 4 shows an exemplary non-limiting flow for an exemplary system as described herein. As shown in a flow 400, the process begins by activation of the system by the user at 402. At 404, calibration is performed, for example by having the user take one or more poses or perform one or more movements. Next, the process of immersive telecommunication with animation begins at 406, as sensor and optical camera data is received. The optical camera and sensor data are at least used to track one or more movements of the user. Optionally audio data, for example from a microphone, is provided as part of the sensor data.

At 408, these data inputs are processed by at least one AI engine and preferably a plurality of AI engines as described herein. The processed inputs are used to determine a user pose at 410, which is then displayed to the recipient at 412, as part of a streaming animation of the transmitting user's movements, optionally with voice or other audio data.

FIG. 5 shows an exemplary non-limiting flow for training an exemplary AI model as described herein. As shown with regard to flow 500, the training data is received in 502 and it is processed through the convolutional layer of the network in 504. This is if a convolutional neural net is used, which is the assumption for this non-limiting example. After that the data is processed through the connected layer in 506 and adjust according to a gradient in 508. Typically, a steep descent gradient is used in which the error is minimized by looking for a gradient. One advantage of this is it helps to avoid local minima where the AI engine may be trained to a certain point, but may be in a minimum which is local, but is not the true minimum for that particular engine. The final weights are then determined in 510 after which the model is ready to use.

Data may be obtained from a plurality of images of movements of a user, such as for example obtaining optical camera data of these movements. Other types of sensor data may be provided as well for training the AI model.

Figure 6:
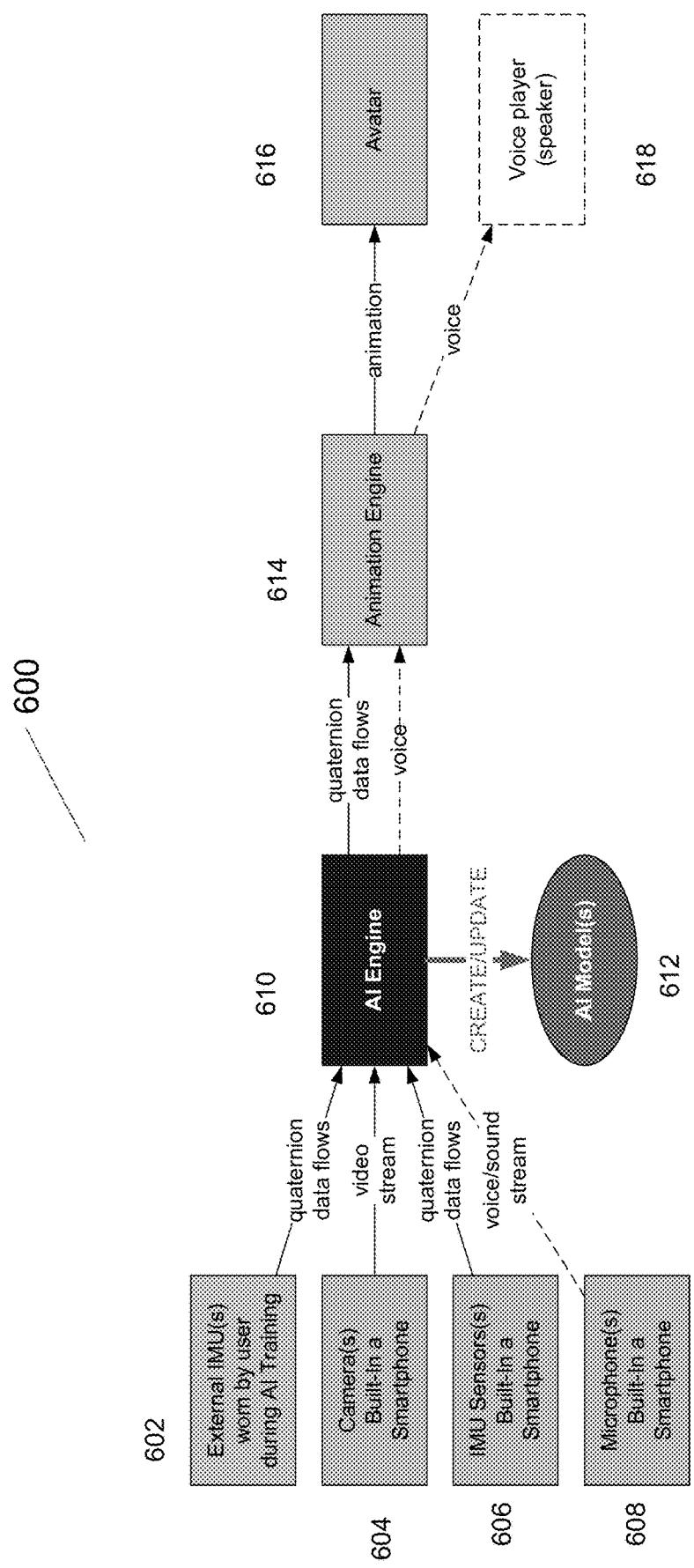
FIG. 6 shows an exemplary non-limiting system for training an exemplary AI model as described herein with quaternions.
Figure 7:
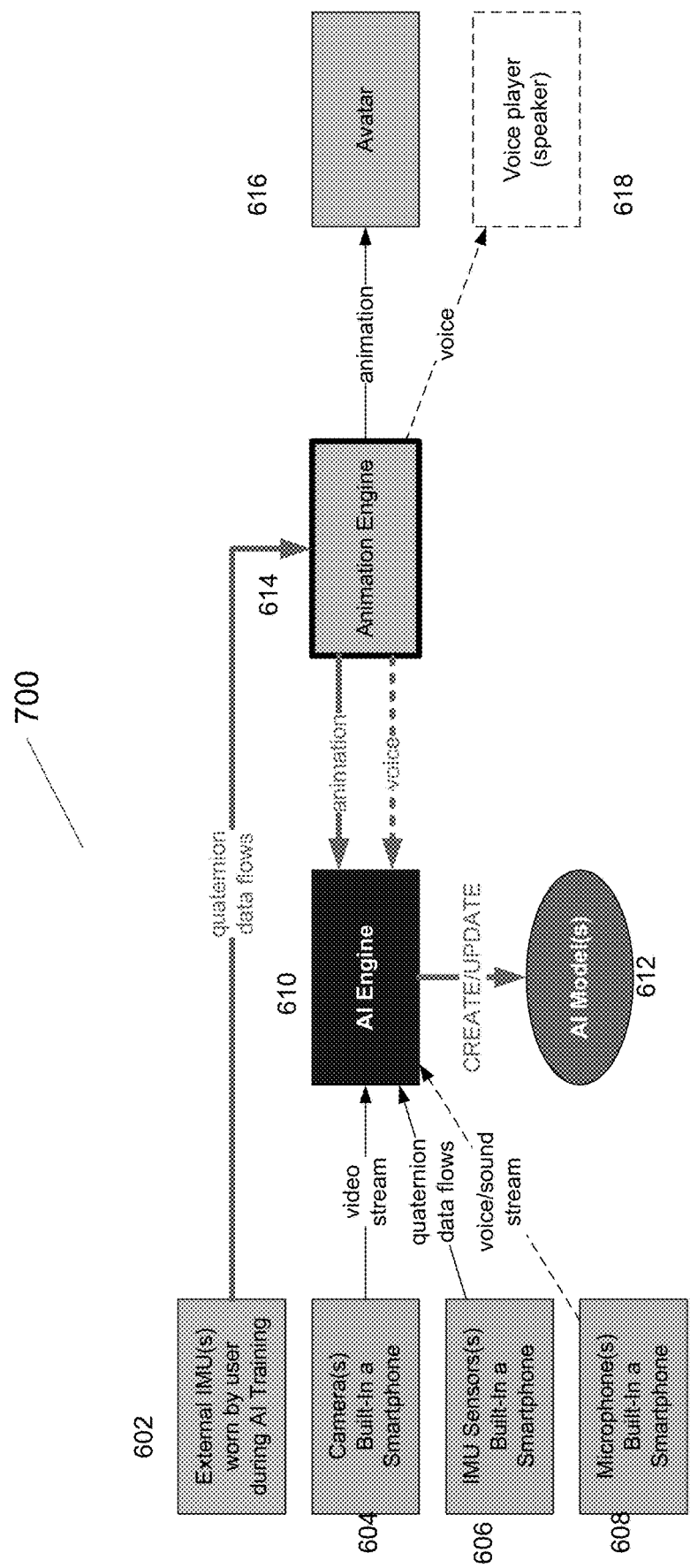
FIG. 7 shows an exemplary non-limiting system for training an exemplary AI model as described herein with animation data.
Figure 8:
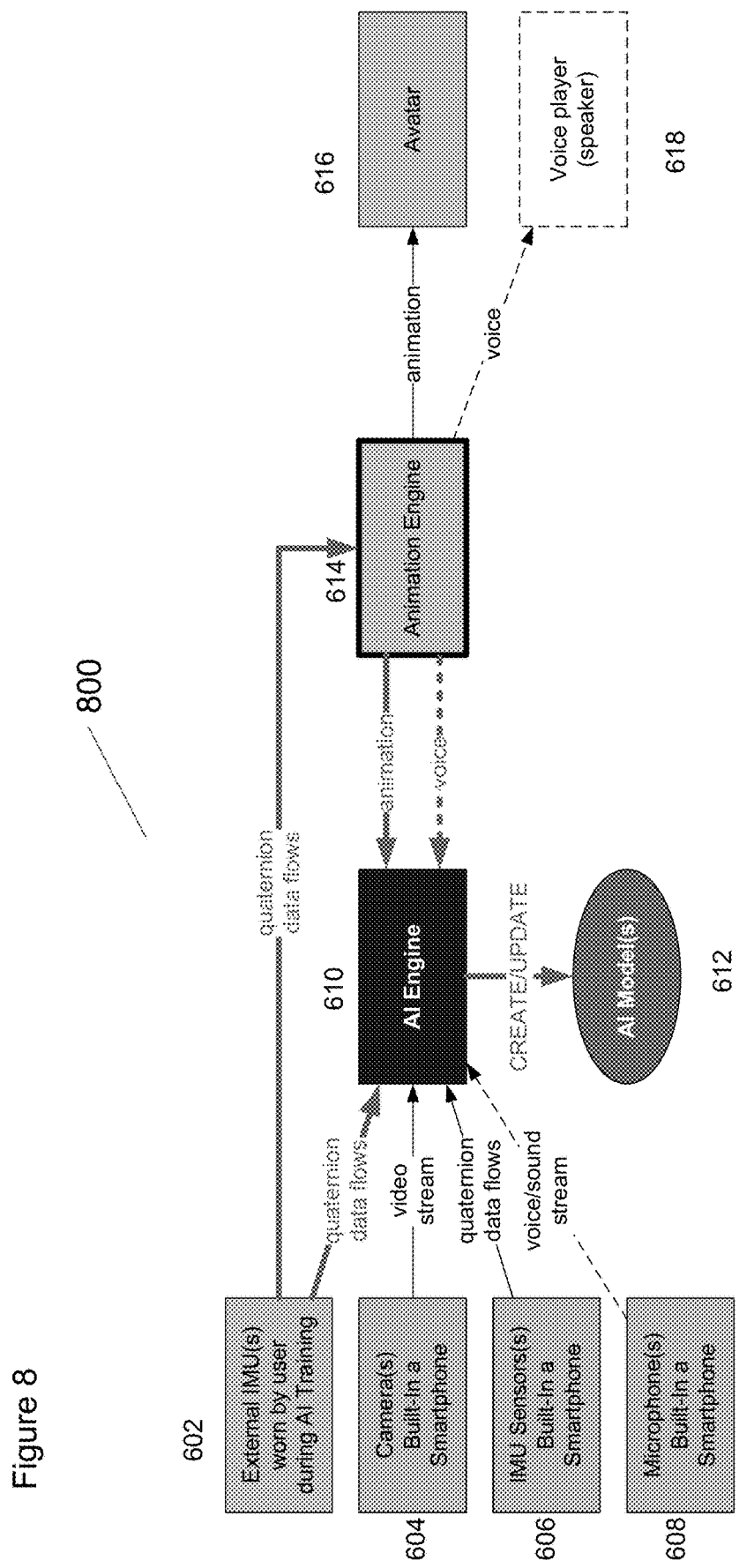
FIG. 8 shows an exemplary non-limiting system for training an exemplary AI model as described herein with a combination of quaternions and animation data.

FIGS. 6-8 relate to three exemplary, non-limiting systems for training an exemplary AI engine and hence creating one or more AI model(s) as described herein. Components with the same reference number have the same or similar function.

FIG. 6 shows an exemplary non-limiting system for training an exemplary AI model as described herein with quaternions. As shown in a system 600, an external IMU 602 is attached to a moving entity, which may be a human, non-human animal, or a non-living object or system of objects that may move. Information about movements of the moving entity, or parts thereof, may be transmitted by external IMU 602. Measurements by external IMU 602 may relate to the actions of a plurality of actual physical assets (physical twins) as digital twins. The term "digital twin" as used herein may refer to a digital replica of one or more of potential and actual physical assets (physical twin), processes, people, places, systems and devices that can be used for various purposes.

For a human digital twin, IMU 602 may be worn by a user, for example by being attached to the clothing of the user, being provided in a wristband, worn on a headset and the like. For a non-human animal, IMU 602 may be similarly worn by being attached to an item worn by the animal. For an object or a system of objects, IMU 602 may be attached to a part of each such object. For a plurality of IMUs 602, multiple such attachments may be present for each of the above physical twins to the digital twin. Also providing such IMU(s) 602 for such objects may be useful for training a user through remote learning and any suitable immersive telecommunications application or modality, for example for operation and repair of physical equipment.

External IMU 602 may be replaced by another suitable sensor, including without limitation an accelerometer, magnetometer, and/or a gyroscope, and/or another such sensor that measures rotation. Preferably external IMU 602 creates a clean real-time digital stream of quaternions, through sensor fusion. Quaternions from external IMU 602 are provided to an AI engine 610. External IMU 602 is an example of a sensor that may be present in such a training sensor set. Optionally other such sensors are also present, including but not limited to a gyroscope, an accelerometer, magnetometer, a microphone, a combination of such sensors and/or a plurality of such sensors. Preferably, the training sensor set of sensors, such as external IMU 602, features a sufficiently large number of sensors such that an accurate measurement of movements of the moving entity may be captured. Additionally or alternatively, the training sensor set may be attached to a moving entity that is not a human user (such as a non-human animal and/or an inanimate object), as well as to a moving entity that is a human user, or a combination thereof.

A camera 604 provides an optical image data stream to AI engine 610. The optical image data is combined and/or otherwise correlated with the quaternions during training, as the movements of the user are provided as both quaternions from external IMU 602 and optical image data from camera 604. AI engine 610 is able to correlate movements of the user, as detected through quaternion data, to those movements detected in the optical image data, during the training phase. Training then produces a trained AI model 612. As noted with regard to FIGS. 9 and 10, trained AI model 612 may then be used to create an animation of the user's movements from optical camera data stream, without requiring the user to wear an IMU.

System 600 also preferably includes a microphone 608, for recording and transmitting voice data and other sounds made by the user and/or by a non-human animal and/or an object or system of objects. Such data is also preferably provided to AI engine 610 and may also be incorporated into training AI model 612, for example to be able to correlate speech and other sounds made by the user with one or more animations.

System 600 may incorporate camera 604 and microphone 608 into a smartphone or other mobile communication device (not shown). If so, then such a device preferably also features an IMU 606, internal to the device itself (as opposed to being worn by the user). Again, IMU 606 may be replaced by an accelerometer, magnetometer, and/or a gyroscope, and/or a sensor that measures rotation. If present, quaternion data from IMU 606 is preferably also fed to AI engine 610 for training AI model 612.

AI engine 610 may separately provide movement data and also voice data to an animation engine 614. Animation engine 614 may then create animations of the movement data of the user, and synchronize such animations with the voice data. For example, animation engine 614 may convert the measured rotation to movement of a particular part of a representation of the user, such as an avatar or other representation 616. The term "avatar 616" is used collectively herein to refer to any suitable type of animated representation. The voice and/or other audio data may be played back through a speaker 618, for example.

Optionally smoothing algorithms may be used, for example to smooth motion over a set of joints and/or to simulate movement of musculature or other underlying aspects of the avatar or other representation. The animations are provided to create at least movements, and preferably also body language and facial expressions, of avatar 616. As described with regard to U.S. patent application Ser. No. 17/098,316, filed on 13 Nov. 2020 ("SYSTEM AND METHOD FOR IMMERSIVE TELECOMMUNICATIONS"), which is owned in common with the present application and has at least one inventor in common, and which is incorporated by reference as if fully set forth herein, animation of avatar 616 may be provided through rigging or other suitable methods for animation.

Optionally, animation engine 614 creates animations of the movement data, and then feeds such animations back to AI engine 610, for training AI model 612. Optionally AI model 612 comprises a plurality of such AI models. Alternatively or additionally, animation engine 614 trains a separate AI model, separate from AI model 612 (not shown). Also alternatively or additionally, animation engine 614 creates the animations of the movement data but does not feed them back to train an AI model. For the latter, optionally user movements are captured as described, but avatar 616 may not be shown to the user and voice data may not be played back through speaker 618. Optionally speaker 618 is not present during training.

FIG. 7 shows an exemplary non-limiting system for training an exemplary AI model as described herein, in a different embodiment, by using animation data. In a system 700, quaternions are now fed from external IMU 602 to animation engine 614. Animation engine 614 then creates animations directly from the quaternion data. These animations are then fed back to AI engine 610. Optionally, animation engine 614 matches the incoming voice data to the animations, which is then also fed back to AI engine 610. AI engine 610 then trains AI model 612 with a combination of the animations and optical data from camera 604.

FIG. 8 shows an exemplary non-limiting system for training an exemplary AI model as described herein, in a different embodiment, by using a combination of quaternions and animation data. In a system 800, quaternion data from external IMU 602 flows both directly to AI engine 610 and also to animation engine 614. Animation engine 614 creates animations from the quaternion data. AI engine 610 trains AI model 612 with a combination of the quaternion data from external IMU 602, the animations from animation engine 614, and also optical data from camera 604.

Figure 9:
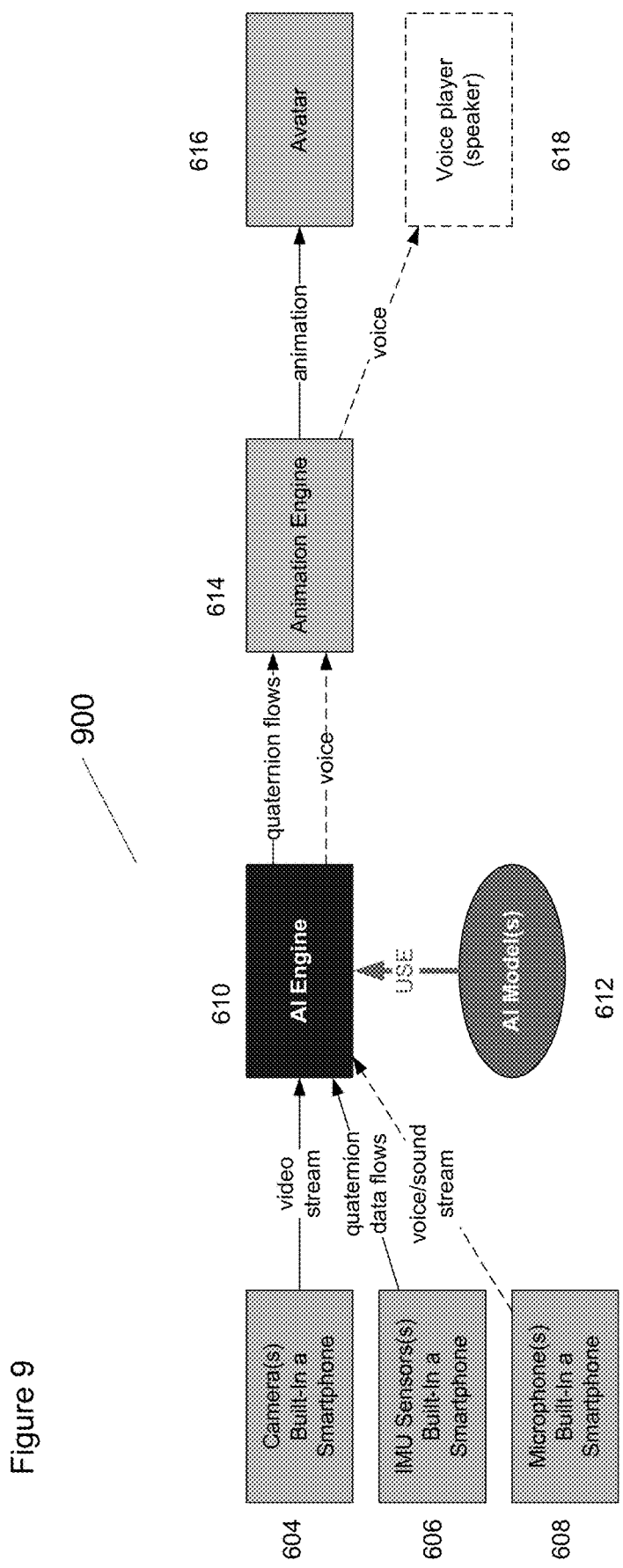
FIG. 9 shows an exemplary non-limiting system for rendering movements of a user through an animation engine.
Figure 10:
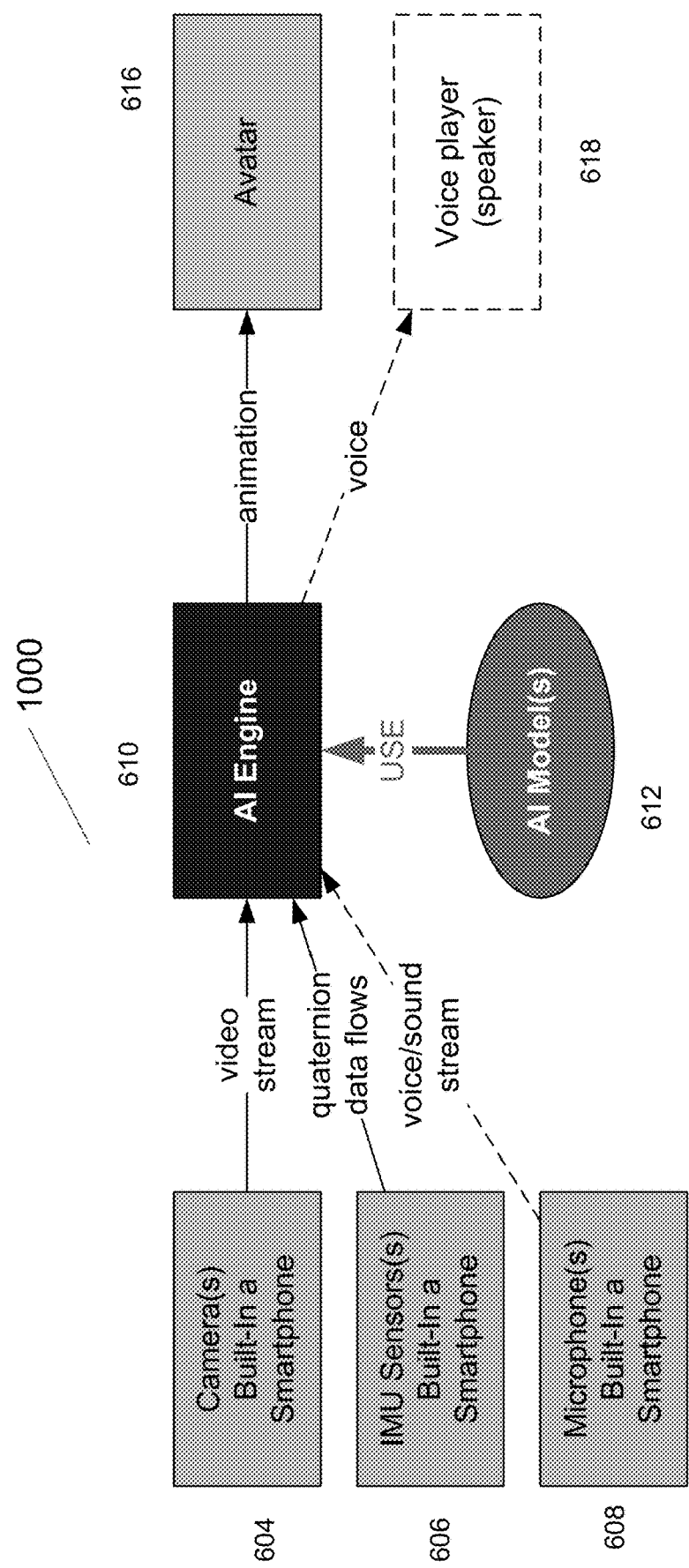
FIG. 10 shows an exemplary non-limiting system for rendering movements of a user directly through the AI engine.

FIGS. 9 and 10 show different exemplary, non-limiting systems for rendering movements of a user, whether through a separate animation engine or else directly through the AI engine. Components with the same reference number in any of FIGS. 6-10 have the same or similar function. In both Figures, AI model 612 is a trained model or models, preferably trained according to any of the training systems and methods described with regard to FIGS. 6-8.

FIG. 9 shows an exemplary non-limiting system for rendering movements of a user through an animation engine. As shown in a system 900, AI engine 610 uses AI model 612 to provide quaternion flow information, or a representation thereof, to animation engine 614. Animation engine 614 then generates animations to animate avatar 616 from such information. Voice data is optionally passed directly through AI engine 610 to animation engine 614, for being matched with the animations. Alternatively or additionally, voice data is analyzed by AI model 612, such that a representation of the voice data may be provided to animation engine 614.

System 900 now preferably lacks the previously described external IMU worn by the user. System 900 preferably features the smartphone or other mobile communication device as previously described (not shown), which features camera 604, one or more built-in IMUs 606 and microphone 608. Optical data from camera 604, combined with quaternions from IMU 606, are preferably used by AI model 612 to provide movement information to animation engine 614.

FIG. 10 shows an exemplary non-limiting system for rendering movements of a user directly through the AI engine. A system 1000 now does not feature animation engine 614. Instead, the creation of animations from the previously described data, and optionally matching such animations to voice data, is performed by AI model 612 for AI engine 610. AI engine 610 then outputs animations to animate avatar 616.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A system for transmitting animations, the system comprising a transmitting user computational device, a recipient user computational device, a server gateway and computer network, wherein said transmitting user computational device, said recipient user computational device and said server gateway communicate through said computer network;
the transmitting user computational device further comprising an optical camera for capturing movements of a moving entity;
said server gateway comprising an AI (artificial intelligence) engine for analyzing said optical data to determine a plurality of movements of said moving entity, wherein said server gateway generates animation instructions from said determined plurality of movements;
said recipient user computational device receiving said animation instructions and animating a representation of said moving entity according to said animation instructions;
wherein said sensor comprises an IMU (Inertial Measurement Unit) and said AI engine comprises an AI engine interface for receiving a continuous data flow of input data, and for outputting a continuous output flow of animation instructions, and an AI model;
wherein said AI model receives a continuous stream of quaternions from said IMU for determining a continuous stream of rotations, to determine said animation instructions according to said received continuous stream of quaternions as said continuous stream of rotations.

2. The system of claim 1, wherein said transmitting user computational device comprises a mobile communication device and wherein said optical camera is built into said mobile telephone.

3. The system of claim 2, wherein said transmitting user computational device comprises a sensor for transmitting sensor data regarding movements of said moving entity through said transmitting user computational device to said server gateway.

4. The system of claim 3, wherein said sensor is built into said mobile communication device.

5. The system of claim 4, wherein said sensor further comprises one or more of an accelerometer, magnetometer, a gyroscope, another sensor measuring rotations, or a combination thereof.

6. The system of claim 5, wherein said AI engine comprises an AI engine interface for receiving a continuous data flow of input data, and for outputting a continuous output flow of animation instructions; wherein said AI engine comprises an optical data preprocessor for preprocessing optical data, an audio data preprocessor for preprocessing audio data and an IMU data preprocessor for preprocessing IMU data; and wherein said AI engine comprises one AI model or a plurality of AI models, said AI models comprising an optical data AI model, an audio data AI model and an IMU data AI model; wherein said animation instructions are output from said AI model or said plurality of AI models.

7. The system of claim 5, wherein said AI engine comprises an optical data preprocessor for preprocessing optical data, an audio data preprocessor for preprocessing audio data and an IMU data preprocessor for preprocessing IMU data, further comprising a training sensor set for being attached to, worn by or integrated with said moving entity, wherein said training sensor set provides quaternions according to movements of said moving entity, wherein said AI engine comprises an AI model, and wherein said AI model is trained according to a combination of quaternions from said training sensor set and said optical data.

8. The system of claim 7, wherein said AI model generates movement information data according to said optical data and said quaternions, and wherein said server gateway further comprises an animation engine, wherein said animation engine generates said animation instructions.

9. The system of claim 7, wherein said AI model generates said animation instructions directly from said optical data and said quaternions.

10. The system of claim 7, wherein said training sensor set comprises an IMU (Inertial Measurement Unit), an accelerometer, magnetometer, a gyroscope, another sensor measuring rotations, or a combination thereof; and wherein said AI model is trained according to data from said training sensor set, in combination with said quaternions from said IMU integrated with said mobile communication device and said optical data.

11. The system of claim 10, wherein said AI model is trained according to data received directly from said training sensor set, said quaternions from said IMU integrated with said mobile communication device and said optical data.

12. The system of claim 11, wherein said server further comprises an animation engine, wherein said animation engine creates animations according to data received from said training sensor set, and said AI model is trained according to said animations, said quaternions from said IMU integrated with said mobile communication device and said optical data.

13. The system of claim 11, wherein said server further comprises an animation engine, wherein said animation engine creates animations according to data received from said training sensor set, and said AI model is trained according to said animations, said data received directly from said training sensor set, said quaternions from said IMU integrated with said mobile communication device and said optical data.

14. The system of claim 11, wherein said training sensor set comprises a plurality of said sensors, and wherein said sensors are placed at a plurality of different locations on said moving entity.

15. The system of claim 14, wherein said training sensor set comprises a sufficiently large number of said sensors to accurately capture movements of said moving entity.

16. The system of claim 15, wherein said moving entity comprises a non-human animal, and wherein said animation instructions animate said representation for representing movements of said non-human animal.

17. The system of claim 15, wherein said moving entity comprises an inanimate object, and wherein said animation instructions animate said representation for representing movements of said inanimate object.

18. The system of claim 15, wherein said representation comprises a pre-rigged avatar.

19. The system of claim 14, wherein said moving entity comprises a human being, and wherein said animation instructions animate said representation for representing movements of said human being.

20. The system of claim 14, wherein said training sensor set comprises a plurality of IMU sensors.

21. The system of claim 14, wherein said training sensor data set comprises a plurality of accelerometers, magnetometers, gyroscopes, IMU, GPS (Global Positioning System), compass, sensors, microphones or a combination thereof.

22. The system of claim 7, wherein said animation instructions are generated only according to said optical data of said camera from said mobile communication device and said quaternions.

23. The system of claim 7, wherein said mobile communication device preprocesses said optical data, said quaternion data or a combination therefore before transfer to said server.

24. The system of claim 2, wherein said mobile communication device is selected from the group consisting of a mobile phone, AR/VR (augmented reality/virtual reality) headset, smart contact lens and glasses.

25. A system for transmitting animations, the system comprising a transmitting user computational device, a recipient user computational device, a server gateway and computer network, wherein said transmitting user computational device, said recipient user computational device and said server gateway communicate through said computer network; wherein the transmitting user computational device is selected from the group consisting of mobile phone, AR/VR (augmented reality/virtual reality) headset, smart contact lens and smart glasses, and further comprises an optical camera for capturing movements of a moving entity; said server gateway comprising an animation engine for analyzing said optical data to determine a plurality of movements of said moving entity as animation instructions, wherein said animation engine comprises an AI (artificial intelligence) engine; said recipient user computational device receiving said animation instructions and animating a representation according to said animation instructions; wherein the system does not feature a depth sensor; further comprising a training sensor set for being attached to, worn by or integrated with said moving entity, wherein said training sensor set comprises an external IMU (Inertial Measurement Unit) and provides a continuous data flow of three dimensional rotations according to said moving entity, wherein said AI engine comprises an AI model, and wherein said AI model is trained according to a combination of quaternions from said training sensor set and said optical data; wherein said AI model generates movement information data according to said optical data and said rotations, and wherein said server gateway further comprises an animation engine, wherein said animation engine generates said animation instructions according to an output of said AI model.

26. The system of claim 25, further comprising a microphone to capture audio sounds from said moving entity.

27. The system of claim 25, wherein said animation engine further receives said rotations, inputs said animation information to said AI model according to said rotations.

28. The system of claim 27, wherein only said animation engine directly receives said rotations during training.

29. The system of claim 25, wherein said AI model receives live optical data of said movements of said moving entity from said the transmitting user computational device, and does not further receive said rotations from said external IMU after training, and said animation engine generates said animation instructions according to said output of said AI model.

30. The system of claim 25, wherein said AI model generates said animation instructions directly from said optical data.

31. A system for transmitting animations, the system comprising a transmitting user computational device, a recipient user computational device, a server gateway and computer network, wherein said transmitting user computational device, said recipient user computational device and said server gateway communicate through said computer network; the transmitting user computational device further comprising an optical camera for capturing movements of a moving entity; said server gateway comprising an AI (artificial intelligence) engine for analyzing said optical data to determine a plurality of movements of said moving entity, wherein said server gateway generates animation instructions from said determined plurality of movements; said recipient user computational device receiving said animation instructions and animating a representation of said moving entity according to said animation instructions;

wherein said transmitting user computational device comprises a mobile communication device and wherein said optical camera is built into said mobile communication device; wherein said transmitting user computational device comprises a sensor for transmitting sensor data regarding movements of said moving entity through said transmitting user computational device to said server gateway; wherein said sensor is built into said mobile communication device; wherein said sensor comprises one or more of an IMU (Inertial Measurement Unit), an accelerometer, magnetometer, a gyroscope, another sensor measuring rotations, or a combination thereof; and wherein said AI engine comprises an AI engine interface for receiving a continuous data flow of input data; wherein said AI engine comprises an optical data preprocessor for preprocessing optical data, an audio data preprocessor for preprocessing audio data and an IMU data preprocessor for preprocessing IMU data; wherein said AI engine outputs movement information to an animation engine; wherein said animation engine outputs animation instructions to said recipient user communication device.

32. The system of claim 31, wherein during training, said moving entity has an additional IMU sensor for generating quaternions; wherein said quaternions are transmitted to said animation engine, to said AI engine or both; and wherein said AI engine is trained according to said quaternions from said additional IMU sensor.

33. The system of claim 32, wherein during training, said moving entity has an additional IMU sensor for generating quaternions; wherein said quaternions are transmitted only to said AI engine; and wherein said AI engine is trained according to said quaternions from said additional IMU sensor.

34. The system of claim 32, wherein during training, said moving entity has an additional IMU sensor for generating quaternions; wherein said quaternions are transmitted only to said animation engine, such that animation information is output from said animation engine to said AI engine for training said AI engine.

35. The system of claim 32, wherein during training, said moving entity has an additional IMU sensor for generating quaternions; wherein said quaternions are transmitted both to said AI engine and to said animation engine; and wherein said AI engine is trained according to said quaternions from said additional IMU sensor.

* * * * *